United States Patent Office 3,639,298
Patented Feb. 1, 1972

3,639,298
FLAME RESISTANT LATEX COMPOSITIONS,
ARTICLES MADE THEREFROM AND PROCESSES FOR PRODUCING SAME
Fred Lister and Ludwig A. Wax, Dover, Del., assignors to Standard Brands Chemical Industries, Inc., Dover, Del.
No Drawing. Filed Feb. 29, 1968, Ser. No. 709,208
Int. Cl. C08j 1/18
U.S. Cl. 260—2.5 FP                28 Claims

ABSTRACT OF THE DISCLOSURE

A flame retardant composition suitable for preparation of films, foams, adhesives, coatings and the like comprising a rubbery latex of a copolymer prepared from a monomeric mixture of an aliphatic conjugated diene, a halogen-containing aliphatic ethylenically unsaturated monomer and a copolymerizable monomer containing carboxyl groups admixed or compounded with certain weight proportions of a flame retardant additive of a hydrated alumina. Preferably, one or more curing agents are also compounded with the latex.

This invention relates to improved flame retardant latex compositions. More particularly, this invention relates to flame retardant rubber latex compositions containing halogen- and carboxyl-containing diene copolymer latices admixed with a flame retardant additive, processes for forming the flame retardant compositions into films, coatings, sheets, foams and the like; the articles produced therefrom and to composite articles coated or laminated with these compositions.

Heretofore, many attempts have been made to prepare flame retardant rubber compositions from polymeric latices. These attempts include, for example, the use of blends of diene copolymers with polyvinyl chloride resin, and the use of special inorganic fillers and in the case of foams, the additional use of admixtures of selected foam stabilizers and curing accelerators, special foaming techniques and combinations thereof.

In general, these proposed processes and techniques have not successfully produced rubbery compositions which have the physical properties suitable for coatings, adhesives, sheets, films, cushions, mattresses, rug backings, carpet underlays and the like applications while still showing a high degree of flame retardancy.

Advantageously, in accordance with this invention a flame retardant latex composition is produced which has outstanding flame retardancy and also physical properties suitable for many applications, especially as rug or carpet underlays.

Thus, this invention contemplates a flame-retardant latex composition comprising a rubbery latex of a copolymer prepared from a monomeric mixture of an aliphatic conjugated diene, a halogen-containing aliphatic ethylenically unsaturated monomer, and a copolymerizable monomer containing carboxyl-groups admixed or compounded with certain weight proportions of a flame retardant additive of a hydrated alumina and preferably one or more curing agents. Also the invention concerns a process in which the compounded latex is made into a film or the like noncellular structure and the film is dried and cured.

In addition, this invention contemplates a process for producing flame retardant foams in which the carboxyl- and halogen-containing latex is compounded with a selected foam stabilizing combination of a thermogelling additive and at least one curing agent and the hydrated alumina in certain weight proportions, the compounded latex is made into a foam and the foam is gelled, dried and cured.

More particularly, one aspect of this invention is directed to a process for producing flame-retardant synthetic rubber latex foams which comprises admixing (1) a latex of an elastomeric copolymer produced from a monomeric mixture of from about 40 to about 70% by weight of an aliphatic conjugated diene, about 30 to about 45% by weight of a halogen-containing ethylenically unsaturated aliphatic monomer and from about 0.5 to about 20% by weight of a carboxyl-containing monomer copolymerizable with the diene, (2) a foam stabilizing combination of a cellulose derived thermogelling thickening agent and a resinous type curing agent capable of reacting with the carboxyl groups of the latex, and (3) a flame retardant additive of hydrated alumina; forming the mixture into a foam; and therefater cell stabilizing, drying and curing the foam upon the application of heat; the amount of hydrated alumina used and the monomer content of the latex copolymer chosen acting together to impart flame retardancy to the resultant foam product.

This invention is also directed to the unique flame-retardant rubber articles obtained by the above-described processes. It will be understood that these articles, for example the foams, contain sufficient hydrated alumina distributed through their cellular structures so that the foams possess outstanding flame retardancy, while still exhibiting good physical foam properties such as delamination resistance, compression resistance, low compression set and the like. Also, another aspect of this invention is concerned with composite articles made from flame retardant latex rubber compositions by laminating or coating fibrous or non-fibrous substrates with such compositions; including carpet underlays—foam or film, padded foam dashboards, foam cushions and the like.

Thus, in accordance with this invention it has been found that latices of halogen- and carboxyl-containing diene copolymers, e.g. a copolymer produced from a monomeric mixture of 67.5 parts butadiene, 30 parts of vinylidene chloride and 2.5 parts of acrylic acid by emulsion polymerization, when compounded with at least about 200 parts of a hydrated alumina containing at least 2.0 moles of water per mole of aluminum oxide (the parts being based on the weight of the dry copolymer solids in the latex), will produce a rubbery composition having outstanding flame-retardancy, i.e., the composition only slowly chars when placed in the flame of a Bunsen burner and upon removal from the burner the flame extinguishes itself immediately.

Advantageously it has also been found that by selecting certain monomeric mixtures to produce the halogen- and carboxyl-containing diene copolymers and by further compounding at least about 5 parts of a combination of certain thermogelling cellulose derivatives and methylolmelamine condensates, rubbery foams having good foam properties and the outstanding flame retardancy can be obtained with lesser amounts of the hydrated alumina.

The unique halogenated carboxylic latices or aqueous copolymer dispersions of this invention, which have pendant halogen and carboxylic acid groups on the polymer chain, can be prepared by effecting emulsion polymerization of the appropriate monomeric mixture, as heretofore described, in an acidic or nearly neutral aqueous system containing a suitable primary emulsifier. Furthermore, it has been found that the addition of small concentrations of auxiliary emulsifiers or dispersants advantageously increases the rate of polymerization of such monomeric mixtures, and the stability of the resultant latices.

The latices suitable for this invention are prepared from monomeric mixtures containing at least one carboxyl-containing unsaturated monomer, at least one aliphatic conjugated diene and a halogen-containing ethylenically unsaturated aliphatic monomer, both of the latter monomers being copolymerizable with the diene. Thus it will be appreciated that the preferred latices may be prepared from one or more monomers containing carboxyl groups.

The carboxyl-containing monomers that can be used to prepare the unique carboxylic latices of this invention include a variety of unsaturated monocarboxylic and polycarboxylic acids and the partial esters of the polycarboxylic acids. In general, suitable acids are characterized by possessing one or more olefinic carbon-to-carbon double bonds and one or more carboxyl groups in which at least one of the olefinic carbon-to-carbon double bonds are activated, as is understood in the polymerization art, to render the acid copolymerizable with the diene and the halogenated monoolefinic monomer.

Suitable carboxyl-containing monomers are represented by the following formula:

in which R is preferably hydrogen or carboxyl, but may be carboxylic ester, alkyl or alkenyl, Y is hydrogen, carboxyl, carboxylic ester, halogen, cyano, sulfo, alkyl, aryl, thienyl or furyl, Z is a methylene or a substituted methylene group, or an allyl, arylene, thienylene or furylene divalent radical, $n$ is zero or any whole number, suitably not exceeding 3, and in which at least one of the group R and Y is carboxyl or Z is carboxyl-containing. Representative examples of the monocarboxylic acids designated by the above formula include acrylic and substituted acrylic acid and other copolymerizable ethylenically unsaturated monocarboxylic acids, such as crotonic acid, alpha-chlorocrotonic acid, hydrosorbic acid, cinnamic acid, m-chlorocinnamic acid, p-chlorocinnamic acid, acrylic acid, alpha-chloroacrylic acid, methacrylic acid, ethacrylic acid, vinyl thiophenic acid, alpha-furyl acrylic acid, vinyl furoic acid, p-vinylbenzoic acid, vinyl naphthaoic acid, alpha-isopropenyl acrylic acid, alpha-styrenyl acrylic acid, 2-carboxy-4-phenyl-1,3-butadiene, sorbic acid, alpha-methyl sorbic acid, alpha-ethyl sorbic acid, alpha-chloro sorbic acid, alpha-bromo sorbic acid, beta-chloro sorbic acid, alpha-, beta-, or gamma-epsilon-dimethyl sorbic acid, 2,4-heptadienoic acid, alpha- and beta-vinyl acrylic acids.

In addition, such monomers include olefinically unsaturated polycarboxylic acids such as fumaric, maleic, mono- and dichloro maleic, citraconic, mesaconic, itaconic, aconitic, ethyl maleic acid, methyl itaconic, muconic, hydromuconic, glutaconic; 2-carboxy-pentadiene-(2,4)-oic-1, beta-(p-carboxyphenyl) acrylic, 2,4-pentadiendioic-1,3 acid, the dimer and trimer of methacrylic acid and other mono-olefinic and polyolefinc polycarboxylic acids, the mono-olefinic acids being preferred for many applications of the unique carboxylic latices. The utilization of these copolymerizable polybasic acids or their anhydrides which are readily hydrolyzed in the acidic polymerization provides a means for direct introduction of the polycarboxylic acid groups into the polymer chain.

The partial esters of unsaturated polycarboxylic acids employed in this invention may be prepared from unsaturated carboxylic acids having two or more carboxyl groups or the anhydrides thereof. It will be understood that the expression "partial ester of an unsaturated polycarboxylic acid" refers to those compounds in which at least one carboxyl group is unreacted. As noted above, examples of unsaturated polycarboxylic acids include fumaric, maleic, glutaconic, citraconic, itaconic, mesaconic, aconitic, and the like, with fumaric, maleic, and itaconic acids being particularly preferred for the purposes of preparing partial esters. Although many compounds containing hydroxyl groups may be considered as alcohol components useful to esterify at least one of the carboxyl group in the polycarboxylic acids, the aliphatic saturated and unsaturated alcohols containing from 1 to about 20 carbon atoms, and preferably from 1 to 10 carbon atoms have been found to be the most preferred.

Preferably, the partial esters employed are the "half esters" or monoesters prepared from unsaturated acids containing two carboxylic groups. These monoesters of dibasic acids have the structural formula:

wherein X represents the acid residue of a dibasic acid having from 4 to 8 carbon atoms, and preferably from 4 to 5 carbon atoms and R' represents an alkyl, aryl, alkylaryl, aralkyl, cycloaliphatic group, or halogen-, acyloxy-, or alkoxy-substituted derivative thereof containing from about 1 to 15 carbon atoms, and with the alkyl groups containing from 1 to 8 carbon atoms being most preferred radicals, and wherein the R' group may be substituted on either of the carboxylic groups of the acid residue.

Exemplary of the radicals represented by R' in the above formula are: methyl, ethyl, propyl, isopropyl, butyl, isobutyl, sec-butyl, t-butyl, amyl, hexyl, decyl, chloromethyl, chloroethyl, cyclohexyl, methyl-cyclopentyl, propyl-cyclopentyl, amyl-cyclopentyl, methyl-cyclohexyl, dimethyl-cyclohexyl, phenyl, propyl-phenyl, isopropyl-phenyl, benzyl, acetoxy-ethyl, chlorophenoxy-ethyl, methoxy-propyl, and the like.

In preparation of the latex foams of this invention, it has been found that certain carboxyl-containing monomers must be used in the monomeric mixture in order to obtain acceptable foam structures. Thus, in accordance with this invention the carboxyl-containing monomers suitable for foams are the mono-olefinically unsaturated mono-carboxylic acids and half esters of dicarboxylic acids enumerated above and represented by Formula I which contain a carboxyl group attached to a carbon atom free of interfering substituents, e.g. alkyl groups.

In Formula I, Z is therefore limited to unsubstituted methylene groups and Y is hydogen when $n$ is zero.

Particularly preferred monomers for producing foams are acrylic acid and monomethyl itaconate. Advantageously, it has also been found that selected blends of the monocarboxylic monomers and other unsaturated carboxyl-containing monomers also are effective for producing acceptable flame retardant foam structures.

In general at least about 50% by weight of the carboxyl-containing monomers used in the monomeric mixture must be of the mono-carboxylic type. Exemplary of especially suitable blends are acrylic acid, admixed with either itaconic acid or fumaric acid and monomethyl itaconate admixed with either fumaric acid or itaconic acid; monomethyl itaconate admixed with fumaric acid being a preferred blend.

The aliphatic conjugated dienes suitable for preparing carboxylic latices include the butadiene-1,3 hydrocarbons such as butadiene-1,3 itself; 2-methyl butadiene-1,3 (isoprene); 2,3-dimethyl butadiene-1,3; piperylene; 2-neopentyl butadiene-1,3; and other hydrocarbon homologs of butadiene-1,3. In addition, the substitute dienes, such as 2-chloro butadiene-1,3; 2-cyano butadiene-1,3; the straight chain conjugated hexadiene, and the like, are found suitable. In general, dienes containing more than 10 carbon atoms polymerize very slowly, if at all, in the present polymerization system; consequently, it is preferred to employ a diene having ten carbon atoms or less. Dienes having from 4 to 6 carbon atoms have particularly advantageous reaction rates and polymerization characteristics and, therefore, are preferred. The butadiene-1,3-hydrocarbons, and butadiene-1,3, in particular, are preferred.

The choice of the halogen-containing ethylenically unsaturated aliphatic monomers that can be used to prepare the foam-forming latices of this invention is limited to vinyl monomers such as vinylidene chloride and trichloro ethylene. Of these monomers, vinylidene chloride is the most preferred because it copolymerizes more readily in the present emulsion polymerization systems and also it tends to produce more rubbery copolymers.

The amount of carboxyl-containing unsaturated monomer, aliphatic diene and halogen-containing ethylenically unsatuarated monomer used to prepare the carboxylic latices of this invention has been found to be critical. In general, the monomeric mixtures contain from about 30 percent to about 70 percent by weight of a conjugated diene, and from about 0.5 percent to about 10 percent (from about 1 to about 5 percent being preferred) by weight of the carboxyl-containing monomer, with the combined weight of these two monomeric materials usually constituting the major portion of the total monomeric mixture. The halogen-containing ethylenically unsaturated monomer which is the essential and most critical part of the monomeric mixture constitute a key proportion of the monomeric charge and it must be present in amounts from at least 30 percent by weight to about 70 percent by weight of the total monomer charge.

It has been found, however, that in the preparation of foams the content of diene and the halogen-containing monomers must be further limited to obtain acceptable foam structures. Specifically, the diene content should be from at least about 40 percent to about 70 percent by weight and the halogen-containing monomer content should be from at least about 30 percent to about 45 percent by weight of the total monomer charge; the content of carboxyl-containing monomers remaining the same as above, that is from about 0.5 to about 10 percent by weight.

Preferably when foams are the desired products, the halogen-containing monomer constitutes from about 32.5 percent to about 40 percent by weight of the monomer charge and the carboxyl-containing monomer is preferably less than about 10 percent of the monomer charge.

A particularly effective monomeric mixture for preparation of the foams of this invention contains 60 percent by weight butadiene, 37.5 percent by weight vinylidene chloride and 2.5 percent by weight of acrylic acid.

As heretofore noted, the copolymerization of the halogen and carboxyl-containing copolymers is advantageously effected by emulsification of the monomers in acid aqueous medium using emulsifiers stable therein. Suitable emulsifiers include the ethers and esters of polyglycols with aliphatic acids having from 10 to 20 carbon atoms; alkyl sulfates where the alkyl group contains from 10 to 20 carbon atoms, alkaryl polyether sulfates or sulfated monoglycerides and similar emulsifiers that will occur to those skilled in the art. A particularly effective type of emulsifier has been found to be the alkali metal salts of alkyl sulfates. The polymerization system may also include small amounts of stabilizers known to the art.

The polymerization reaction usually is promoted by the addition of free radical yielding initiators such as the alkali persulfates, percarbonates, perborates, and the like; organic peroxides, such as benzoyl peroxide, acetyl peroxide and the like; alkyl peroxides such as di-t-butyl peroxide; and organic hydroperoxides such as di-isopropyl benzene hydroperoxide. Redox systems of initiation may be employed utilizing the above-mentioned substances with suitable reducing agents well known in the art.

The quantity of initiator included in the aqueous emulsion polymerization recipes varies over a wide range, but in most cases an initiator concentration of between about 0.02 and 3.0 percent by weight based on the weight of total monomer charge is satisfactory, with 0.05 to 0.5 percent by weight of initiator being the preferred range.

The monomeric reaction mixtures may also contain small amounts, e.g. about 0.5 to 2 parts per 100 parts of the monomer charge of the sulfhydryl-group-containing compounds termed "modifiers" in the synthetic rubber industry such as alkyl mercaptans containing from about 10 to 22 carbon atoms, for example, n-dodecyl mercaptan, the commercially available mixed tertiary mercaptans containing from 12 to 16 carbon atoms, thiophenol, alpha- or beta-thionaphthol, and the like. The polymerization can be effected within a wide range of temperatures, for example, within the range of from about 0° to about 100° C. and preferably from about 60° to 80° C. Under such conversion conditions, it has been found that high conversions can be obtained and it is the usual practice to continue polymerization until conversions of 85 percent or more are reached. Conventional short-stopping agents such as hydroquinone, sodium sulfide, tetramethyl thiuram disulfide, or sodium dimethyl dithiocarbamate and the like may be added to the polymerization system to control the level of conversion. However, this is ordinarily neither preferred nor particularly advantageous in most latex foam systems. However, the polymerization reaction may be facilitated by the use of a seed latex, i.e., a small amount of a preformed latex having the desired monomer ratio. The seed latex is added to the monomeric charge prior to effecting polymerization.

The amount of water used in the polymerization system may be varied considerably depending on the solids content desired in the resulting latices. In general, from about 100 to 200 parts of water per hundred parts of monomeric mixture are used to produce latices having a solids content of from about 40 percent to about 60 percent by weight.

After the polymerization reaction has obtained the desired conversion level, the unreacted monomers and some water, are removed by vacuum stripping to produce a copolymer in the form of a latex or dispersion of small droplets or globules within an aqueous phase.

The synthetic latex thus prepared is then usually treated by neutralizing or alkalizing the latex, e.g., with ammonium hydroxide, to a pH of from about 8.0 to about 9.5. A pH of from about 9.0 to 9.5 is generally preferred.

In the preparation of foams this neutralized synthetic rubber latex is then admixed with a number of conventional foam ingredients, e.g., foaming aids such as sodium lauryl sulfate, cell detackifying agents, and one or more antioxidants.

In accordance with this invention, the latex to be made into foam must be admixed with a foam stabilizer admixture or combination which comprises a mixture of a thermogelling additive or agent and curing agent. The thermogelling agents particularly suitable for the processes of this invention are cellulose derivatives such as a propylene glycol ether of cellulose, i.e. hydroxy-propoxy-methoxy-cellulose, methoxy cellulose and hydroxy-propoxy-cellulose which are thickening agents that have the unique property of gelling upon being heated.

The curing agents which form part of the foam stabilizer admixture may include melamine resins, urea resins, melamine-formaldehyde condensates (e.g. the methylol melamine condensates) urea-formaldehyde condensates, alkylated melamine-formaldehyde condensates and urea-formaldehyde condensates (e.g. methylated melamine-formaldehyde condensates), certain liquid epoxy resins, other amine-formaldehyde condensates such as the condensation products of ethylene diamine and formaldehyde, hexamethylene diamine-formaldehyde condensates and the like. As used herein, the curing agents are often in a "water-dispersible" condition, that is emulsified or dissolved in water or dissolved in water miscible solvents.

According to this invention, condensates of trimethylol melamine or methylol melamine and blends thereof are particularly effective curing agents and are the preferred.

The foam stabilizing admixture or combination usually is used in amounts from about 5 to about 15 parts by weight based on the total weight of the dry latex solids in the foam composition. The weight ratio between the thermogelling thickening agent and the curing agents in the admixture may vary from about 1:20 to 1:40; the preferred ratio being about 1:30.

The flame retardant additive used to prepare the flame retardant compositions of this invention is a hydrated alumina containing at least 2.0 moles of water per mole of aluminum oxide. Peferably the hydrate is a freshly precipitated aluminum hydroxide containing 3 moles of water, i.e. $Al_2O_3 \cdot 3H_2O$.

In accordance with this invention it has been found that the amount of hydrated alumina required is dependent on the halogen content of the monomeric mixture used to prepare the synthetic latex. Generally, a greater amount of hydrated alumina is required when the amount of halogen-containing monomer is reduced. Amounts ranging from at least about 100 parts to about 500 parts of the hydrated alumina per 100 parts of the latex solids may be used. Usually not more than 400 parts are necessary to impart flame retardancy.

In the applications where the preferred melamine condensate resins are used as curing agents, it has been found that at least 100 parts of the hydrated alumina per 100 parts of latex solids are necessary to insure the high level of flame retardancy exhibited by the compositions of this invention. When, for example, the amount of vinylidene chloride in the copolymer latex is as low as 30 percent by weight, as much as 150 or more parts of hydrated alumina may be required to provide a flame retardant foam.

When the latex compositions only contain the other enumerated curing agents or when they are compounded without any curing agent, it has been found that higher amounts of the hydrated alumina must be used, i.e. about 200 parts per 100 parts of the latex solids.

Thus, it will be appreciated that the amount of hydrated alumina added provides a simple means for controlling the flame retardancy of the latex compositions, i.e., the flame retardancy can be maintained by adding greater amounts of the hydrated alumina during compounding rather than by preparing a more halogenated copolymer.

It will also be appreciated that other fillers, such as the calcium silicates and carbonates, may also be added together with the hydrated alumina to prepare the compounded latex as desired. In addition, other flame retardant additives such as antimony trioxide and non-volatile halogenated hydrocarbons such as chlorinated paraffins may be added. Advantageously, it has been found that when particularly strict flame-proof requirements are to be met, the foams of this invention can achieve a greater degree of flame retardance with the substantially lesser amounts of these other flame retardants, e.g. about 5 parts of $Sb_2O_3$ per 100 parts of latex solids, than those foams heretofore made by known processes. In this regard, it will be appreciated that the hydrated alumina is preferred over other flame-retardant additives because of its flame suppression efficiency, because its use in the required proportions provides improved film-forming (and particularly foaming) properties for the compositions, and also because of its availability and relative low cost.

After compounding, the latex may be foamed or frothed by the use of blowing agents and the techniques often used (which are well known in the art) for preparing various kinds of known latex foams. Also the compounded latex may be foamed by whipping air into it with a mixer or by the use of apparatus having foam heads therein. After the foam is formed, it usually is cast or otherwise deposited as a layer on a substrate, e.g., a continuous plastic web or a fibrous backing. The foam may adhere to the substrate, or if foam articles alone are desired, the substrate may have a releasable coating.

The foam may be gelled, dried and cured in a continuous manner by placing in a heated oven or the like at a temperature of from about 100° F. to 350° F. for periods of a few minutes to an hour or more; the choice of temperature is dependent on the substrate used as well as the combination of thermogelling agents and curatives employed.

It will be understood that in the preparation of flame retardant latex compositions suitable for making films, sheets and other non-cellular structures, the neutralized latex of the halogen- and carboxyl-containing copolymer must be compounded with the flame retardant additive of hydrated alumina in the proportions heretofore described.

Preferably, latex compositions to be made into films are compounded to also contain one or more curing agents. The preferred curing agents and the amounts used are the same as those used for preparing the foams, i.e. the reactive type network resins such as the methylol melamine condensates. However, a number of the other curative resins and other curing agents conventionally used in the curing or vulcanization of carboxylic diene elastomers also may be employed.

Thus, the latex compositions of this invention which are used for applications other than foams can be cured by effecting reaction of the carboxyl groups on the copolymer chain with polyvalent cations which form inorganic bases, oxides or hydroxides; organic bases or the like. This reaction, which is effected by heating the compounded latex containing such curing agents at elevated temperatures, e.g. 125° to 400° F., causes a bridging or cross-linking of the carboxyl groups in different copolymer chains.

It has been found that the use of salts, basic oxides and hydroxides of polyvalent metals such as calcium, magnesium, zinc, lead and the like provide particularly effective ionic cross-linking.

Advantageously, sulfur, and sulfur-containing vulcanization agents, as well as the organic peroxides and other organic curing accelerators may also be used together with the polyvalent metal curing agents. Generally, from about 1.5 to about 5.0 parts of a polyvalent cation-containing compound or compounds such as zinc oxide, calcium hydroxide or the like are used per 100 parts of the copolymer solids in the latex.

It will be appreciated that the halogen- and carboxyl-containing-latex compositions of this invention can be used for a number of applications without the addition of the above-enumerated curing agents. Such flame-retardant compositions usually are not formed into films, since the films do not have the necessary tensile, elongation or other physical properties required for many applications such as rug backings, but the compositions without curing agents are effective as adhesives or protective coatings for metals, fibrous materials and the like.

The flame retardant compositions to be made into non-cellular articles are prepared by mixing or compounding the halogen- and carboxyl-containing latices with the flame retardant additive of hydrated alumina and preferably one or more curing agents as well as other compounding aids conventionally used, e.g. fillers, pigments, antioxidants, etc. Thereafter the compounded latex may be deposited as a film or the like on a substrate by dipping, spraying, rolling or other coating techniques, with or without coagulants, and the resulting film dried, and if curing agents are used, cured by the application of heat. The resulting film may be left on the substrate or it may be removed by the use of a substrate having a releasable coating.

As heretofore noted, when polyvalent metal curing agents are used, curing is effected by heating the articles in an oven to temperatures of from about 125° F. to about 400° F. At these temperatures, the cross-linking reaction usually goes to completion in from a few minutes (i.e. 5 to 10 minutes) to about 2 hours.

The following specific examples further illustrate this invention (all parts and percentages referred to herein are by weight unless specified otherwise):

EXAMPLE I

This example illustrates the preparation of a latex copolymer suitable for the flame retardant compositions, especially the foams, of this invention by emulsion polymerization in a stirred reactor. An aqueous solution consisting of 130 parts water and an emulsifying agent (0.5 part of a sodium salt of lauryl sulfate), a chelating agent (0.03 part of ethylenediaminetetraacetic acid) and an anionic dispersant (0.5 part of a polymerized alkyl naphthalene sulfonic acid—Tamol SN) was charged to the reactor together with 3 parts of a seed latex (a copolymer of butadiene-1,3, vinylidene chloride and acrylic acid) made from a monomeric mixture of 60 parts BD, 37.5 parts of VC and 2.5 parts of AA.

A modifier (0.2 part of a tertiary dodecyl mercaptan) was added to the reactor followed by the addition of 37.5 parts of vinylidene chloride (VC) 2.5 parts of acrylic acid (AA), and 60 parts of liquid butadiene (BD).

The contents of the reactor were then heated to 130° F. and a peroxygen type initiator (0.07 part of potassium persulfate) was injected.

At 17–22% conversion 0.25 part of the emulsifier (i.e. sodium lauryl sulfate) was injected together with 0.025 part of the peroxygen initiator and the temperature was raised to 140° F.

At 55–65% conversion an additional 0.025 part of the peroxygen initiator was injected and the temperature was raised to 150° F. The polymerization reaction was continued until a conversion of about 90% was obtained. At this conversion the agitation was stopped and the pH of the system was adjusted to 9.0–9.5 with ammonium hydroxide and 0.2 part of tetrasodium pyrophosphate was added. The unreacted monomers and some water were then removed by vacuum stripping to produce a latex having a solids content of about 56%, expressed as weight of dry solids based on the total weight of latex. After stripping, additional ammonium hydroxide solution was added to further stabilize the latex by adjusting the pH to 8.5 to 9.0. The latex will be designated as Latex A.

EXAMPLE II

In this example, a flame-retardant foam is prepared in accordance with the process of this invention from the latex prepared in Example I. Initially the latex is adjusted to a pH of 9.0 to 9.5 by the addition of ammonium hydroxide and then compounded in the following proportions:

| Ingredients | Percent solids | Parts used (dry) |
| --- | --- | --- |
| Latex A—BD/VC/AA | 55–56 | 100 |
| Sodium lauryl sulfate | 30.0 | 1.20 |
| Silicone oil | 100.0 | 1.00 |
| Alkylated phenol [1] antioxidant | 40.0 | 1.00 |
| Hydrated alumina ($Al_2O_3 \cdot 3H_2O$) | 100.0 | 150.0 |
| Propylene glycol [2] ether of cellulose | 2.5 | 0.25 |
| Methylated trimethylol [3] melamine condensate | 80.0 | 5.00 |
| Methylol melamine [4] condensate | 50.0 | 2.50 |

[1] Naugawhite, sold by Naugatuck Chemical Division of U.S. Rubber.
[2] Methocel 65 HG (4,000 cps.), sold by Dow Chemical Company.
[3] Cyrex 933, sold by American Cyanamid Company.
[4] Cyrex 711, sold by American Cyanamid Company.

The total solids content of this composition was approximately 72%.

This compounded latex was then frothed in a planetary mixer to form a wet foam having a cup weight of 25 g. per 60 ml., then cast in a 3/16 inch gauge onto a precoated all polypropylene tufted carpet substrate. This coated carpet was then placed in a Geer oven for 20 min. at 290° F. to effect gelling, drying and curing of the foam.

The resulting foam backing had the following physical properties:

(1) Gauge—3/16 inch
(2) Oz./sq. yd.—50.9
(3) Delamination strength in lbs./2 inch width—4.0
(4) Compression resistance p.s.i.—9.4
(5) Compression set percent—4.2

EXAMPLE III

Following the procedure outlined in Example II, another foam backing was prepared, using the same ingredients with the exception that 100 parts of hydrated alumina was used instead of 150 parts. Testing of the foam revealed the following foam properties:

(1) Gauge—3/16 inch
(2) Oz./sq. yd.—51.4
(3) Delamination strength in lbs./2 inch width—5.4
(4) Compression resistance p.s.i.—9.5
(5) Compression set percent—4.3

It will be appreciated that the physical properties exhibited by this foam and that prepared in Example II substantially exceed those set for commercial high density carpet underlays.

EXAMPLE VI

Samples of the foam prepared as outlined in Examples II and III were tested for their flame resistance by inserting into the flame of a Bunsen burner. Slight charring occurs while in the flame, but upon removal, the flame surrounding the foam immediately extinguishes itself.

EXAMPLE V

Utilizing the procedures outlined above, and the latex prepared in Example I, a number of foam slabs are produced by substituting whiting, i.e. calcium carbonate, or silicates in place of hydrated alumina. Upon testing the samples of the foam produced in this manner, it is found that the foam ignites in the Bunsen burner and continues to burn after removal.

EXAMPLE VI

Following the procedures outlined in Example I a number of additional latices were prepared from monomeric mixtures having the following monomer content in weight percentages:

Latex B: | Percent
--- | ---
Butadiene | 50
Vinylidene chloride | 47.5
Acrylic acid | 2.5
Latex C: |
Butadiene | 40
Vinylidene chloride | 57.5
Acrylic acid | 2.5
Latex D: |
Butadiene | 55
Vinylidene chloride | 42.5
Acrylic acid | 2.5
Latex E: |
Butadiene | 60
Vinylidene chloride | 27.5
Trichloroethylene | 10
Acrylic acid | 2.5

Foams were made from above designated latices, i.e., B through E, following the compounding and foaming techniques and using the same amounts of hydrated alumina and melamine condensate set forth in Example II. These foams were tested to determine their flame retardance and their foam properties. As a result of these tests, it was found that all foams exhibited flame retardancy. However, the foams prepared from latices B and C exhibited objectionable properties such as poor color, poor cell structure, poor delamination strength, high compression set and low compression resistance. These foams are of substantially no commercial value.

The foam prepared from latices D and E however, exhibited foam and fire retardant characteristics similar to those prepared from the latex described in Example I.

EXAMPLE VII

In order to further illustrate the criticality of the relative amounts of halogen-containing ethylenically unsaturated monomer used to prepare the compositions of this invention additional latices were prepared following the procedures and using the polymerization recipe used in Example I with the exception that the following monomeric mixtures (given in weight percent) were used:

Latex: F                                          Percent
  Butadiene ........................................ 65
  Vinylidene chlorine .............................. 32.5
  Acrylic acid ..................................... 2.5
Latex G:
  Butadiene ........................................ 70
  Vinylidene chloride .............................. 27.5
  Acrylic acid ..................................... 2.5

The above latices, i.e., F and G were compounded and made into foams following the general procedure outlined in Example II, also using 150 parts of hydrated alumina ($Al_2O_3 \cdot 3H_2O$). The foams were cast as ½ inch gauge slabs on a jute backing, gelled, dried and cured for 30 minutes in an oven at 325° F. The resulting foams were tested to determine their flame retardance by inserting into the flame of a Bunsen burner. The foam samples prepared from Latex F initially charred but were self-extinguishing upon removal from the burner flame. In contrast, the foam samples prepared from Latex G ignited in the burner flame and kept on burning after removal for 10 seconds or more. Although eventually the flames continuing on these foams also are extinguished, these foams do not have sufficient flame retardancy for the purposes of this invention.

EXAMPLE VIII

A butadiene-styrene-acrylic acid (60/37.5/2.5) latex was prepared by using the polymerization techniques and recipe given in Example I with 37.5 parts of styrene being substituted for the vinylidene chloride. This latex (Latex H) was compounded and made into a foam slab by using the compounding ingredients and procedures set forth in Example II.

When tested for flame retardancy, as outlined in Example IV the resulting foam slab showed no flame resistance, i.e. the foam slab ignited when placed in the flame of a Bunsen burner and continued to burn after removal from the flame.

EXAMPLE IX

Using the emulsion polymerization procedures and the recipe set forth in Example I, additional latices were prepared by replacing a portion or all of the acrylic acid with other carboxyl-containing monomers or mixtures thereof. The resulting latices were then compounded, frothed and made into a wet foam in the manner set forth in Example II. The wet foam was cast into ½ inch foam slabs on a jute backing, gelled, dried, and cured for 30 minutes in an oven at 325° F. The foam slabs were then tested for their foam properties and for their flame resistance as outlined in Examples II, IV and VII.

In Table 1 the monomeric mixtures used to prepare the latices are given in weight percentages and the following abbreviations are used to identify the monomers:

BD=butadiene-1,3
VC=vinylidene chloride
AA=acrylic acid
IA=itaconic acid
MAA=methacrylic acid
MMI=monomethyl itaconate
FA=fumaric acid

TABLE 1

| Latex | I | J | K | L | M | N | O | P |
|---|---|---|---|---|---|---|---|---|
| BD | 60 | 60 | 60 | 60 | 60 | 60 | 60 | 60 |
| VC | 37.5 | 37.5 | 37.5 | 37.5 | 37.5 | 37.5 | 38.0 | 38.0 |
| AA |  |  | 1.5 | 1.5 |  |  |  |  |
| MAA | 2.5 |  |  |  |  |  |  |  |
| MMI |  | 2.5 |  |  | 1.5 | 1.5 |  |  |
| IA |  |  | 1.0 |  | 1.0 |  | 2.0 |  |
| FA |  |  |  | 1.0 | 1.0 |  |  | 2.0 |

As a result of the flame tests, all foams are found to be flame retardant and to be self extinguishing.

Evaluations of the foams for their physical foam properties show that Latex J containing monomethyl itaconate alone gave excellent foams; whereas those latices only containing methacrylic acid, fumaric acid or itaconic acid (i.e. latices I, O and P) yield either coarse center structures combined with objectional foam height loss or show almost complete foam collapse. Latices K, L, M and N which contain blends of acrylic acid or monomethyl itaconate with fumaric or itaconic acid gave foams of good quality; the foams obtained from the acrylic acid blends being less resilient than those from the monomethyl itaconate blends.

EXAMPLE X

Example II was repeated by substituting a number of different thickening-type agents in place of the specified propylene glycol ether of cellulose (also designated as hydroxypropoxy methoxy cellulose). As shown in the following table certain cellulose derivatives, including methoxy cellulose, hydroxy-propoxy cellulose and hydroxy-propoxy-methoxy cellulose are suitable as thermogelling agents for the foams of this invention whereas many types of thickening and/or gelling agents cause complete foam collapse.

TABLE 2

| Suitable agents for producing foams | Agents causing complete foam collapse |
|---|---|
| Group I (preferred):<br>  Hydroxy-propoxy-methoxy celluloses [1] | Group IV:<br>  Hydroxy-ethoxy cellulose.<br>  Sodium carboxylmethoxy cellulose.<br>  Coconut fatty acid amide.<br>  Polysaccharide.<br>  Sodium polyacrylates.<br>  Polyacrylamide.<br>  Polyvinyl alcohol.<br>  Polyvinyl methyl ether.<br>  Sodium alginate.<br>  Ammonium caseinate. |
| Group II:<br>  Methoxy cellulose and other hydroxy-propoxymethoxy celluloses. [2] | |
| Group III:<br>  Hydroxy-propoxy celluloses and still other hydroxy-propoxy-methoxy celluloses. [3] | |

[1] Methocel 65 HG (4,000 cps.), Methocel 90 HG (4,000 cps.), and Methocel 65 HG (400 cps.), sold by Dow Chemical Company.
[2] Methocel MC (100 cps.), Methocel MC (400 cps.), Methocel BL (250 cps.), and Methocel 90 HG (15,000 cps.), sold by Dow Chemical Company.
[3] Methocel 60 HG (50 cps.) and Methocel 90 HG (400 cps.) sold by Dow Chemical Company; Methofas HPM 65, sold by Imperial Chemical Industries, Ltd.; and Klycel H6, sold by Hercules Powder Company Inc.

Furthermore, it was found that the thermogelling agents in Group I provide more stable and uniform foams and are thus preferred over those set forth in Groups II and III.

EXAMPLE XI

Example II was again repeated substituting a number of different thermosetting curative type resins including urea-, melamine-, and phenol-formaldehyde resins, phenolic resins, N-methylol acrylamide and polyamide-epichlorohydrin copolymer, at the same and different levels, for the specified mixture of aldehyde-melamine condensates in order to determine their suitability for producing the compounded latex compositions of this invention. From these experiments it was found that certain water-soluble reactive network resins are better suited for preparation of the foams of this invention, and that other such resins can be used to prepare film-like coatings.

Specifically, the melamine formaldehyde resins, i.e. Cyrex 933, Acrotex Resin M3, Cyrex 711 and Cyrex 915—sold by American Cyanamid Co., the modified urea-formaldehyde resin; Quaset 439—sold by Quaker Chemical and the trimethylol phenol condensate; BRLA–1031—sold by Union Carbide Corporation gave acceptable foam structures: the melamine formaldehyde resins effect more control in gelling and provide more uniform foam structure and are thus much preferred for the preparation of the flame retardant foams of this invention.

The other resins including a blend of melamine-formaldehyde condensate and methylolamide, Permel Resin B and the trioxine-formaldehyde condensate. Cyrex 915 and N-methylolacrylamide, sold by American Cyanamid Co. and the phenolic resin Schenectady SP-8025 sold by Schenectady Chemicals, Inc. are found suitable for film forming compositions.

EXAMPLE XII

Additional foams were made by using the procedures and compounding recipe described in Example II in which other aluminas (calcined and hydrated) were substituted for the specified alumina ($Al_2O_3 \cdot 3H_2O$). The resulting foams were tested for flame retardancy in accordance with test procedures given in Example IV.

From these tests, it was found that none of those compounded latex compositions containing calcined aluminas were flame retardant in the Bunsen burner test. Moreover, it was also shown that not all hydrated aluminas are effective flame retardant additives and that to be effective the hydrated aluminas must contain at least about 2.0 moles of water per mole of aluminum oxide. The most effective and therefore the preferred additives are the trihydrated aluminas; i.e., $Al_2O_3 \cdot 3H_2O$.

EXAMPLE XIII

Example II again was repeated by substituting various blends of whiting, i.e. calcium carbonate and the hydrated alumina for the hydrated alumina alone to produce several foam slab samples. These slab samples when tested by the Bunsen burner test of Example IV show that the blends must contain at least 100 parts of the hydrated alumina per 100 parts of latex solids to provide the necessary flame retardancy, i.e. to be self-extinguishing.

EXAMPLE XIV

Additional latices were prepared by emulsion polymerization of the following monomeric mixtures using the general polymerization techniques outlined in Example I. These polymerizations were conducted with or without the use of a seed latex.

| Latex | Q | R | S | T | U | V | W |
|---|---|---|---|---|---|---|---|
| BD | 55 | 40 | 57 | 58 | 57 | 50 | 45 |
| VC | 42 | 57 | 40 | 40 | 40 | 47 | 52 |
| MMI | 3 | 3 | 3 | | | 3 | 3 |
| IA | | | | 2 | | | |
| MAA | | | | | 3 | | |

These latices are then compounded by using the following variations in the compounding recipe:

Ingredients: Dry parts
- Polymer _____ 100.0
- Antioxidant [1] _____ 1.0
- $Al_2O_3 \cdot 3H_2O$ _____ 100.0–300.0
- $CaCO_3$ _____ 0–150.0
- ZnO _____ 0–5.0
- Methylated trimethylol melamine condensate [2] _____ 0–5.0
- Dicyandiamide _____ 0.2.0

[1] Naugawhite—sold by Naugatuck Chemical Division of U.S. Rubber.
[2] Methocel 65 HG (4000cps.)—sold by Dow Chemical Company.

Films of the compounded latices are cast and film properties evaluated after air drying and after air drying followed by a 5 minute post cure at 300° F. All films are also subjected to the Bunsen burner test for flame retardancy.

The data compiled from these tests show that:

(1) All films containing at least 100 parts of the hydrated alumina and the melamine condensate curative and those containing 200+ parts of the hydrated alumina without the curatives are considered flame-proof i.e. upon removal from the Bunsen burner, the flame surrounding the film immediately extinguishes itself. (Apparently the melamine condensate resins also impart some flame retardancy to the compositions.)

(2) Films cured with the melamine condensate gave higher, i.e. improved film data, including tensile (p.s.i.) elongation (percent) and tear (lbs./in.).

(3) ZnO cured films had in most cases lower physical data than the resin cured films.

(4) Films without curatives, i.e. ZnO or melamine condensate resin, but filled with $Al_2O_3 \cdot 3H_2O$ had the lowest film data and often showed cracks on air drying.

(5) 1:1 filler blends of $CaCO_3$ and $Al_2O_3 \cdot 3H_2O$ gave improved film data.

EXAMPLE XV

This example is a presentation of the results of a flame spread tunnel test on the latex foam prepared in accordance with Examples I and II with the exception that the foam was cast onto a jute backing.

The test was conducted in accordance with the provisions of ASTM Designation E84–61, "Standard Method of Test for Surface Burning Characteristics of Building Materials." This test procedure is similar to that specified in ASA No. 2.5, NFPA No. 255, UL No. 723, and UBC No. 42–1.

The purpose of the test is to evaluate the performance of a material in relation to the performance of asbestos-cement board and red oak flooring under similar fire exposure. The results are in terms of flame spread, fuel contributed, and smoke developed during a 10-minute exposure and are numerically expressed as a ratio with asbestos-cement board at zero and red oak flooring at 100. Periodic calibration tests using select red oak flooring and a 10-minute test with asbestos-cement board prior to each test series establish the basic reference data.

Three pieces of flexible foamed latex 21" x 142", 21" x 135¾", and 21" x 36", were used. These pieces each had a jute carier backing. Each had a unit weight of 53.1 oz. per sq. yd. The total thickness was measured at 3/16" to ¼".

The specimen for the test was prepared by mounting the jute-backed foam on ¼" asbestos-cement board. Four 21" x 76" sections, placed end-to-end, make up a complete 21" x 25'4" specimen.

A. P. Green Insulation Adhesive was applied with a notched trowel to the jute back of the foam, working the adhesive well into the backing. The jute-backed foam was then placed on the rough side of the asbestos-cement board and rolled with a hand roller.

The specimen was placed in the conditioning room for a minimum of 13 days prior to test. The temperature in this room is maintained at 70°–75° F. and a relative humidity of 40–45 percent.

Reference data were obtained and furnace operation for the test checked by conducting a 10-minute test with asbestos-cement board. This provided a zero reference for flame spread, fuel contributed, and smoke density. The 100 reference had been established using red oak flooring. Ignition over the burners occurred 42 seconds after the start of the test, and the flame reached the end of the specimen in 5¾ minutes.

The test specimen, mounted on the noncombustible substrate, was tested according to the standard procedure, with the foam face exposed to the igniting flame.

Test results, calculated on the basis of observed flame travel and the areas under a plot of the furnace temperature and smoke density, are presented below.

CLASSIFICATION TABLE

| Test specimen | Flame spread rate | Fuel contributed factor | Smoke density factor |
|---|---|---|---|
| Asbestos-cement board | 0 | 0 | 0 |
| Red oak flooring | 100 | 100 | 100 |
| Fire retarded foamed latex | 29 | 13 | 20 |

Primary spotty ignition occurred 46 seconds after beginning the test of the latex foam specimen and no after-flame was observed when the burners were shut off at the end of the 10-minute test. Inspection of the exposed specimen disclosed that the foam was intact but had carbonized to 7 feet, charred ⅛ inch at 10 feet, shrinkage cracks to 11 feet, cracked to 14 feet, and had charred on the surface to 15 feet. The surface appeared damaged to 18 feet. However, the jute back was satisfactory at 6½ feet.

From the above test results it is concluded that the described foamed latex material with a jute carrier back, evaluated by the ASTM E84 method and reported above, had a low flame spread rate, a low fuel contributed factor, and developed one fifth as much smoke as red oak flooring.

It will be understood that many other modifications may be made without departing from the teachings and scope of the invention.

What is claimed is:

1. A flame-retardant composition comprising (1) a latex of an elastomeric copolymer prepared by emulsion polymerization of a monomeric mixture of from about 30 to about 70 percent by weight of an aliphatic conjugated diene, from about 30 to about 70 percent by weight of a halogen-containing ethylenically unsaturated aliphatic monomer selected from the group consisting of vinylidene chloride and trichloro ethylene, and a balance of from about 0.5 to about 20 percent by weight of a carboxyl-containing monomer copolymerizable with the diene; admixed with a flame-retardant additive of hydrated alumina containing at least about 2.0 moles of water per mole of aluminum oxide, the amount of hydrated alumina used and the monomer content of the elastomeric copolymer chosen acting together to impart flame-retardancy to said composition.

2. The composition of claim 1 in which from about 200 to about 500 parts by weight of the flame-retardant additive of hydrated alumina are used per 100 parts by weight of dry latex solids in the latex.

3. The composition of claim 1 which further comprises a curing agent capable of reacting with said copolymer upon the application of heat.

4. The composition of claim 3 in which said curing agent comprises a water-dispersable melamine condensate resin, and from about 5 to about 15 parts by weight of the resinous curing agent and from about 100 to about 500 parts by weight of the flame-retardant additive of hydrated alumina per 100 parts by weight of dry latex solids are admixed with the latex.

5. The composition of claim 4 further comprising a cellulose derived thermogelling thickening agent, the weight ratio between the thermogelling thickening agent and the curing agent varying from about 1:20 to about 1:40, said monomeric mixture containing from at least about 40 to about 70 percent of the diene, from about 30 to about 45 percent by weight of the halogen-containing monomer, and at least 50 percent by weight of the carboxyl-containing monomer in the mixture being selected from the group consisting of unsaturated mono-carboxylic acids and partial esters of polycarboxylic acids which contain at least one carboxyl group attached to a carbon atom free of interfering substituents.

6. The composition of claim 5 in which said resinous curing agent comprises a methylol-melamine condensate and the thermogelling thickening agent is selected from the group consisting of hydroxy-propoxy-cellulose, hydroxy-propoxy-methoxy-cellulose and methoxy cellulose.

7. A process for producing flame-retardant non-cellular films which comprises admixing (1) a latex of a copolymer prepared by emulsion polymerization of a monomeric mixture of from about 30 to about 70 percent by weight of an aliphatic conjugated diene, about 30 to about 70 percent by weight of a halogen-containing ethylenically unsaturated aliphatic monomer selected from the group consisting of vinylidene chloride and trichloro ethylene and a balance of from about 0.5 to about 20 percent by weight of a carboxyl-containing monomer copolymerizable with the diene, (2) a curing agent capable of reacting with the copolymer upon the application of heat, and (3) a flame-retardant additive of hydrated alumina containing at least about 2.0 moles of water per mole of aluminum oxide; forming the mixture into a film; and thereafter drying and curing the film upon the application of heat; the amount of hydrated alumina used and the monomer content of the latex copolymer chosen acting together to impart flame-retardancy to the film.

8. The process of claim 7 in which from about 200 to 500 parts by weight of the flame-retardant additive of hydrated alumina per 100 parts by weight of dry latex solids are admixed with said latex.

9. The process of claim 7 in which said curing agent comprises a water-dispersable melamine condensate resin and from about 5 to about 15 parts by weight of the resinous curing agent and from about 100 to about 500 parts by weight of the flame-retardant additive of hydrated alumina per 100 parts by weight of dry latex solids are admixed with the latex.

10. A process for producing flame-retardant synthetic rubber latex foams which comprises admixing (1) a latex of an elastomeric copolymer produced by emulsion polymerization of a monomeric mixture of from about 40 to about 70 percent by weight of an aliphatic conjugated diene, about 30 to about 45 percent by weight of a halogen-containing ethylenically unsaturated aliphatic monomer selected from the group consisting of vinylidene chloride and trichloro ethylene and a balance of from about 0.5 to about 20 percent by weight of a carboxyl-containing monomer copolymerizable with the diene, at least 50 percent by weight of the carboxyl-containing monomer in the mixture being selected from the group consisting of unsaturated monocarboxylic acids and partial esters of polycarboxylic acids which contain at least one carboxyl group attached to a carbon atom free of interfering substituents, (2) from about 5 to about 15 parts of a foam stabilizing combination of a cellulose derived thermogelling thickening agent and a resinous curing agent capable of reacting with the carboxyl groups of the copolymer and (3) from about 100 to about 500 parts of a flame-retardant additive of hydrated alumina containing at least about 2.0 moles of water per mole of aluminum oxide; said parts being based on the weight of 100 parts of dry latex solids; forming the mixture into a foam; and thereafter cell stabilizing, drying and curing the foam upon the application of heat; the amount of hydrated alumina used and the monomer content of the latex copolymer chosen, acting together to impart flame-retardancy to the resultant foam product.

11. The process of claim 10 in which said resinous curing agent comprises a methylol-melamine condensate and the thermogelling thickening agent is selected from the group consisting of hydroxy-propoxy-cellulose, hydroxy-propoxy-methoxy-cellulose and methoxy cellulose.

12. The process of claim 11 in which the weight ratio between the thermogelling thickening agent and the curing agent varies from about 1:20 to about 1:40.

13. A flame-retardant synthetic rubber latex foam which is prepared from a blend of (1) a latex of an elastomeric copolymer produced by emulsion polymerization of a monomeric mixture of from about 40 to about 70 percent by weight of an aliphatic conjugated diene, about 30 to about 45 percent by weight of a halogen-containing ethylenically unsautrated aliphatic monomer selected from the group consisting of vinylidene chloride and trichloro ethylene and a balance of from about 0.5 to about 20 percent by weight of a carboxyl-containing monomer copolymerizable with the diene, at least 50 percent by weight of the carboxyl-containing monomer in the mixture being selected from the group consisting of unsaturated mono-carboxylic acids and partial esters of polycarboxylic acids which contain at least one carboxyl group attached to a carbon atom free of interfering substituents, (2)

from about 5 to 15 parts of a foam stabilizing combination of a cellulose derived thermogelling thickening agent and a resinous curing agent capable of reacting with the carboxyl groups of the copolymer and (3) from about 100 to about 500 parts of a flame-retardant additive of hydrated alumina containing at least about 2.0 moles of water per mole of aluminum oxide; said parts being based on the weight of 100 parts of dry latex solids; the amount of hydrated alumina in the foam and the monomer content of the latex copolymer chosen acting together to impart flame-retardancy to the foam.

14. The foam of claim 13 in which said resinous curing agent comprises a methylol-melamine condensate and the thermogelling thickening agent is selected from the group consisting of hydroxy-propoxy-cellulose, hydroxy-propoxy-methoxy-cellulose and methoxy cellulose.

15. The foam of claim 13 in which the weight ratio between the thermogelling thickening agent and the curing agent varies from about 1:20 to about 1:40.

16. The composition of claim 1 in which the carboxyl-containing monomer is selected from the group consisting of unsaturated mono- and poly-carboxylic acids and partial esters of the polycarboxylic acids.

17. The composition of claim 1 in which the flame retardant additive of hydrated alumina is a trihydrated alumina.

18. The composition of claim 3 in which the resin is a melamine-aldehyde condensate.

19. The process of claim 7 in which the carboxyl-containing monomer is selected from the group consisting of unsaturated mono- and poly-carboxylic acids and partial esters of the polycarboxylic acids.

20. The process of claim 7 in which the resin is a melamine-aldehyde condensate.

21. A film produced by the process of claim 7.

22. The process of claim 10 in which the carboxyl-containing monomer is selected from the group consisting of acrylic acid and monomethyl itaconate.

23. A substrate coated with the foam of claim 13.

24. An article made from the foam of claim 13.

25. The composition of claim 1 in which the monomeric mixture comprises about 60 percent by weight of butadiene, about 37.5 percent by weight of vinylidene chloride and about 2.5 percent by weight of acrylic acid.

26. The process of claim 7 in which the monomeric mixture comprises about 60 percent by weight of butadiene, about 37.5 percent by weight of vinylidene chloride and about 2.5 percent by weight of acrylic acid.

27. The process of claim 10 in which the monomeric mixture comprises about 60 percent by weight of butadiene, about 37.5 percent by weight of vinylidene chloride and about 2.5 percent by weight of acrylic acid.

28. The foam of claim 13 in which the monomeric mixture comprises about 60 percent by weight of butadiene, about 37.5 percent by weight of vinylidene chloride and about 2.5 percent by weight of acrylic acid.

References Cited

UNITED STATES PATENTS

| | | | |
|---|---|---|---|
| 2,512,464 | 6/1950 | Mann | 260—2.5 L |
| 2,611,694 | 9/1952 | Becher | 260—F.P. DIG. |
| 2,653,918 | 9/1953 | Eckert | 260—2.5 L |
| 2,801,274 | 7/1957 | Bethe | 260—2.5 L |
| 3,215,647 | 11/1965 | Dunn | 260—2.5 L |

MURRAY TILLMAN, Primary Examiner

M. FOELAK, Assistant Examiner

U.S. Cl. X.R.

260—2.5 L, 15, 17 R, 28.5 B, 28.5 D, 29.3, 29.4 U A, 29.7 T, 29.7 W, 29.7 A T, 39 M, 39 R, 41.5 R, 45.7 R, 78.5 R, 78.5 C L, 80.7, 836, 837, 845, 852, 853, 887, FP DIG